(12) United States Patent
Li et al.

(10) Patent No.: US 10,877,935 B2
(45) Date of Patent: Dec. 29, 2020

(54) STREAM COMPUTING SYSTEM AND METHOD

(71) Applicant: ALIBABA GROUP HOLDING LIMITED, Grand Cayman (KY)

(72) Inventors: Meifang Li, Beijing (CN); Pumeng Wei, Beijing (CN); Peile Duan, Beijing (CN); Shan Li, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 599 days.

(21) Appl. No.: 15/154,891

(22) Filed: May 13, 2016

(65) Prior Publication Data
US 2016/0335287 A1 Nov. 17, 2016

(30) Foreign Application Priority Data
May 14, 2015 (CN) .......................... 2015 1 0246697

(51) Int. Cl.
| | | |
|---|---|---|
| G06F 7/00 | (2006.01) | |
| G06F 17/00 | (2019.01) | |
| G06F 16/174 | (2019.01) | |
| G06F 16/2455 | (2019.01) | |

(52) U.S. Cl.
CPC .... *G06F 16/1748* (2019.01); *G06F 16/24568* (2019.01)

(58) Field of Classification Search
CPC ......... G06F 17/30156; G06F 17/30144; G06F 17/30516
USPC ........................................................ 707/692
See application file for complete search history.

(56) References Cited

U.S. PATENT DOCUMENTS

| | | | | |
|---|---|---|---|---|
| 5,403,639 A | * | 4/1995 | Belsan | ..................... G06F 16/10 |
| 5,913,927 A | * | 6/1999 | Nagaraj | .............. G06F 11/1092 |
| | | | | 714/6.13 |
| 6,144,999 A | * | 11/2000 | Khalidi | ............... G06F 11/2064 |
| | | | | 709/219 |
| 7,194,548 B1 | * | 3/2007 | Matsumi | ............... G06F 3/0677 |
| | | | | 709/236 |
| 8,099,571 B1 | * | 1/2012 | Driscoll | ................ G06F 3/0613 |
| | | | | 711/162 |

(Continued)

FOREIGN PATENT DOCUMENTS

| | | |
|---|---|---|
| EP | 0936617 A1 | 8/1999 |
| JP | 2014-515523 A | 6/2014 |

OTHER PUBLICATIONS

PCT International Search Report and Written Opinion dated Aug. 22, 2016, issued in corresponding International Application No. PCT/US16/32508 (11 pages).

(Continued)

*Primary Examiner* — Binh V Ho
(74) *Attorney, Agent, or Firm* — Finnegan, Henderson, Farabow, Garrett & Dunner LLP

(57) ABSTRACT

System and method are disclosed for stream computing. An exemplary method may include receive data from a data processing module and determining whether the received data are effective data that are neither incomplete nor duplicative. The method may also include obtaining the effective data when it is determined that the received data are either incomplete or duplicative. In addition, the method may include storing the effective data in a log file of a file system.

24 Claims, 6 Drawing Sheets

(56) References Cited

U.S. PATENT DOCUMENTS

| | | | | |
|---|---|---|---|---|
| 8,639,592 B1* | 1/2014 | Rouse | ................... | G06Q 40/12 |
| | | | | 705/30 |
| 8,713,282 B1 | 4/2014 | Rajimwale et al. | | |
| 2003/0088807 A1* | 5/2003 | Mathiske | ............ | G06F 11/1438 |
| | | | | 714/6.12 |
| 2003/0225899 A1* | 12/2003 | Murphy | .................. | H04L 12/18 |
| | | | | 709/230 |
| 2004/0184764 A1* | 9/2004 | Yagi | ................. | G11B 20/10527 |
| | | | | 386/329 |
| 2004/0193945 A1* | 9/2004 | Eguchi | ................. | G06F 11/142 |
| | | | | 714/6.1 |
| 2006/0271457 A1* | 11/2006 | Romain | ............ | G06Q 20/4016 |
| | | | | 705/35 |
| 2009/0276476 A1 | 11/2009 | Jolly | | |
| 2010/0058158 A1 | 3/2010 | Artz et al. | | |
| 2010/0067871 A1* | 3/2010 | Nakane | ................ | G11B 27/329 |
| | | | | 386/241 |
| 2010/0306286 A1* | 12/2010 | Chiu | ....................... | H04L 67/06 |
| | | | | 707/827 |
| 2010/0313040 A1* | 12/2010 | Lumb | .................. | G06F 3/0623 |
| | | | | 713/193 |
| 2011/0295957 A1* | 12/2011 | Ananthanarayanan | ...................... | |
| | | | | H04L 67/24 |
| | | | | 709/206 |
| 2011/0307444 A1* | 12/2011 | Cox | ..................... | G06F 16/273 |
| | | | | 707/625 |
| 2012/0124011 A1* | 5/2012 | Spackman | .......... | G06F 16/1756 |
| | | | | 707/692 |
| 2012/0303597 A1 | 11/2012 | Bird et al. | | |
| 2013/0073527 A1* | 3/2013 | Bromley | ............. | G06F 16/1748 |
| | | | | 707/692 |
| 2014/0040616 A1* | 2/2014 | Barber | ............ | H04N 21/26606 |
| | | | | 713/168 |
| 2014/0136490 A1* | 5/2014 | Saliba | ................ | G06F 16/1748 |
| | | | | 707/692 |
| 2014/0201169 A1* | 7/2014 | Liu | ......................... | G06F 3/067 |
| | | | | 707/692 |
| 2015/0019716 A1* | 1/2015 | Kim | ...................... | H04L 1/1809 |
| | | | | 709/224 |
| 2015/0178164 A1* | 6/2015 | Zhang | ................. | G06F 11/1471 |
| | | | | 714/20 |
| 2015/0356207 A1* | 12/2015 | Reitman | ................. | G06F 30/15 |
| | | | | 703/1 |
| 2015/0378845 A1* | 12/2015 | Shang | ................... | G06F 11/165 |
| | | | | 707/648 |
| 2016/0080279 A1* | 3/2016 | Tan | ......................... | H04W 4/80 |
| | | | | 370/328 |

OTHER PUBLICATIONS

"Internet protocol suite" from Wikipedia downloaded Feb. 22, 2018; https://en.wikipedia.org/wiki/Internet_protocol_suite; (11 pgs.).

Extended European Search Report, pursuant to Rule 62 EPC, the Supplementary European Search Report (Art. 153(7) EPC) and the European Search Opinion issued in reference to European Application No. 16793645.9-1222 / 3295294; dated Mar. 19, 2018 (8 pgs.).

* cited by examiner

STREAM COMPUTING SYSTEM AND METHOD

CROSS REFERENCE TO RELATED APPLICATION

The present application claims the benefits of priority to Chinese Application No. 201510246697.5, filed May 14, 2015, the entire contents of which have been incorporated herein by reference.

TECHNICAL FIELD

The present application relates to the field of data processing, and more particularly, to data processing methods in a stream computing system.

BACKGROUND

Stream computing refers to technologies for processing large-scale data, often in the form of data streams, in real time based on distributed computing principles. Stream computing aims to extract and utilize the value in the timeliness of the data. The data subject to stream computing can be referred to as stream data. In stream computing, stream data are often unknown and without borders, while computing imposed on the stream data is predefined or known. Therefore, a stream computing system can process stream data based on predefined computational logic.

An exemplary stream computing system is Storm (or Apache Storm). Applications involving the Storm system often incorporate messaging middleware (e.g., Kafka) and/or storage systems (e.g., HBase), using the "pull" mode to obtain data. Because such stream computing system is tightly coupled with the messaging middleware, it is difficult to provide open services to outside requesters. In addition, when a failover occurs, the Storm system uses a source retransmission messaging mechanism. Such mechanism has a high recovery cost, and may cause an avalanche effect under certain circumstances, limiting the horizontal scalability of the system.

SUMMARY

In one aspect, the present disclosure is directed to a method for processing stream data. The method may include receiving stream data from a data source and dividing the received stream data into records. The method may also include writing the records into a file system. The method may further include arranging the records into at least one block. In addition, the method may include sending the at least one block to a logic processing module after the records are successfully written into the file system.

In another aspect, the present disclosure is directed to a method for processing data. The method may include receiving data from a data processing module. The method may also include determining whether the received data are effective data that are neither incomplete nor duplicative. The method may further include obtaining the effective data when it is determined that the received data are either incomplete or duplicative. In addition, the method may include storing the effective data in a log file of a file system.

In a further aspect, the present disclosure is directed to a system for processing stream data. The system may include a data receiving module including at least one processor device. The data receiving module may be configured to receive stream data from a data source and divide the received stream data into records. The data receiving module may also be configured to write the records into a file system. The data receiving module may further be configured to arrange the records into at least one block. In addition, the data receiving module may be configured to send the at least one block to a logic processing module after the records are successfully written into the file system. The system may also include the logic processing module including at least one processor device. The logic processing module may be configured to receive the at least one block from the data receiving module. The logic processing module may also be configured to determine whether the received at least one block are effective data that are neither incomplete nor duplicative. The logic processing module may further be configured to obtain the effective data when it is determined that the received data are either incomplete or duplicative. In addition, the logic processing module may be configured to store the effective data in a log file of the file system.

In a further aspect, the present disclosure is directed to an apparatus for processing stream data. The apparatus may include at least one processor device. The at least one processor device may be configured to receive stream data from a data source and divide the received stream data into records. The at least one processor device may also be configured to write the records into a file system. In addition, the at least one processor device may be configured to arrange the records into at least one block. Moreover, the at least one processor device may be configured to send the at least one block to a logic processing device after the records are successfully written into the file system.

In a further aspect, the present disclosure is directed to an apparatus for processing stream data. The apparatus may include at least one processor device. The at least one processor device may be configured to receive data from a data processing device and determine whether the received data are effective data that are neither incomplete nor duplicative. The at least one processor device may also be configured to obtain the effective data when it is determined that the received data are either incomplete or duplicative. In addition, the at least one processor device may also be configured to store the effective data in a log file of a file system.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

Figure 1:
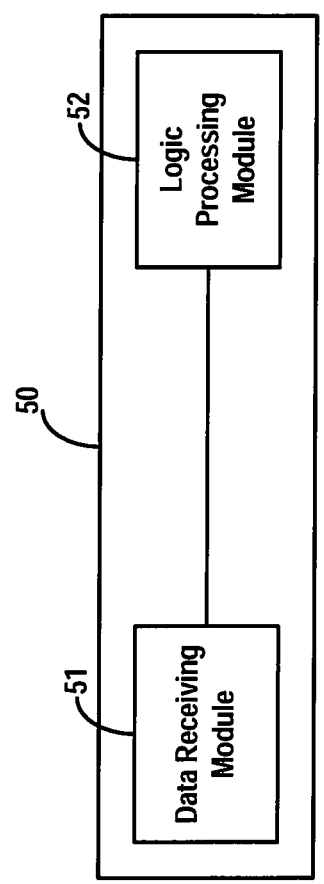
FIG. 1 is a functional block diagram of an exemplary stream computing system, according to an embodiment of the present application.

FIG. 1 shows an exemplary stream computing system 50, according to an embodiment of the present application. In general, a stream computing system may include a frontend HyperText Transfer Protocol (HTTP) server (not shown) and a backend data and application logic processing server. Because the technical solution disclosed herein is primarily for optimizing the backend data and application logic processing server, for simplicity, the stream computing system 50 described in the following passages refers to the data and application logic processing server, unless otherwise noted.

As shown in FIG. 1, system 50 may include two data processing modules: a data receiving module (also referred to as a data receiver) 51 and a logic processing module (also referred to as a logic processor) 52.

Data receiving module 51 may receive data (e.g., stream data) from one or more upstream sources. After receiving the data, data receiving module 51 may write the received data into a file system. Once the data have been successfully written into the file system, data receiving module 51 may send the data to logic processing module 52.

In some embodiments, the file system may be a distributed file system. A distributed file system refers to a file system in which physical storage resources may not be directly connected to a local node. Instead, the physical storage resources may be connected to the node through a computer network.

Instead of using messaging middleware to transmit stream data to system 50, embodiments of the present application may omit the messaging middleware. For example, system 50 may support two data access methods: push and pull. In the push method (also referred to as push mode), data may be pushed from a data source to system 50 using an appropriate application program interface (API), such as Restful API, provided by system 50 and data processing logic implemented outside system 50. In the pull method (also referred to as pull mode), data may be obtained (e.g., pulled) from the data source by system 50 using one or more topologies (e.g., operational or computational logic) of system 50 through an interface provided by the data source. The push mode and the pull mode may not rely on messaging middleware. Different users may use different data sources to receive data. Data receiving module 51 may provide service to outside requesters or users by providing an appropriate API (e.g., Restful API).

Logic processing module 52 may obtain effective data based on conditions of the data received from data receiving module 51. As used herein, the term effective data refer to data that are neither lost nor duplicated. Logic processing module 52 may also update checkpoints periodically. When a failover occurs, logic processing module 52 may determine the most recent checkpoint, retrieve effective data corresponding to the most recent checkpoint, and recover the effective data.

Figure 2:
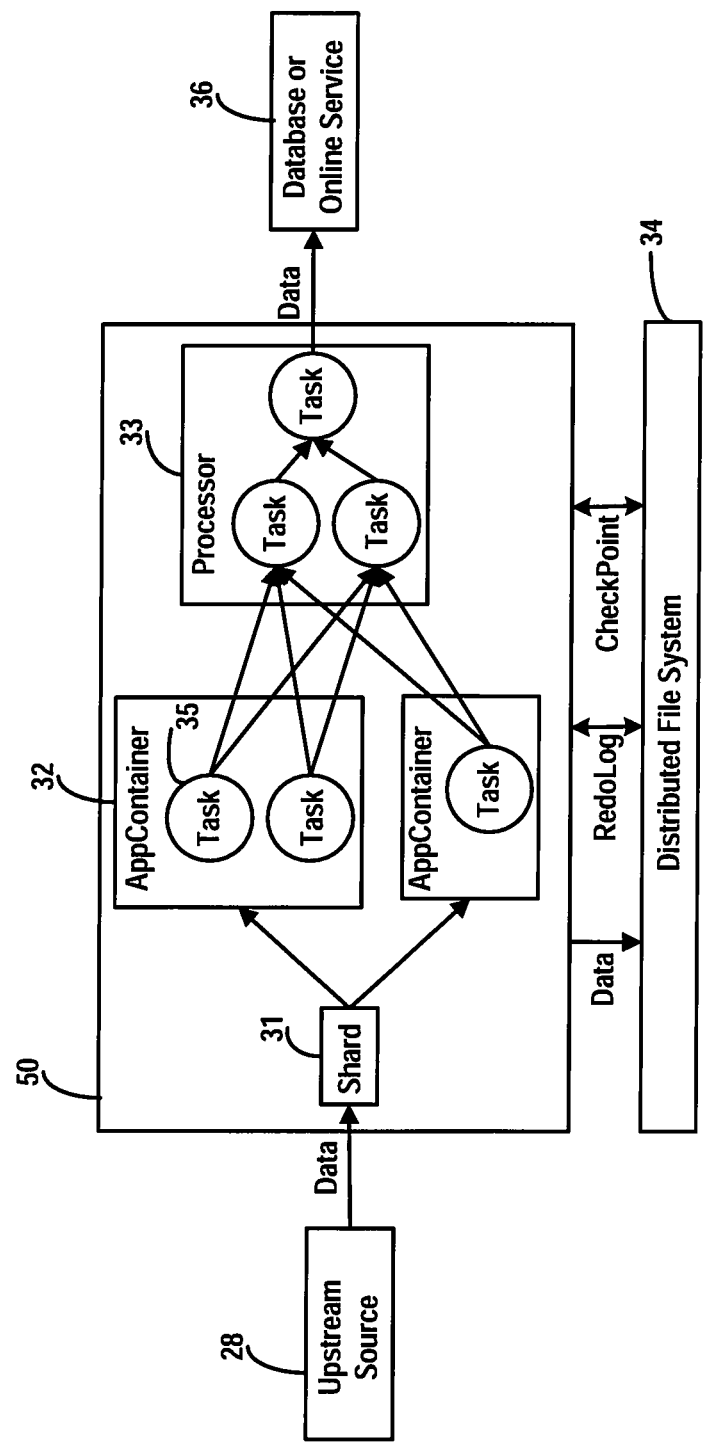
FIG. 2 is a schematic diagram of an exemplary stream computing system, according to an embodiment of the present application.

FIG. 2 shows an exemplary implementation of the stream computing system 50 shown in FIG. 1. In FIG. 2, system 50 may include a Shard 31, one or more AppContainers 32, and one or more Processors 33. Shard 31 may correspond to data receiving module 51. AppContainer(s) 32 and Processor(s) 33 may correspond to logic processing module 52. In other words, Shard 31, AppContainer(s) 32, and Processor(s) 33 are exemplary implementations of the functional modules shown in FIG. 1. The functional modules (e.g., 51 and 52) may be implemented by software and executed by hardware resources, by hardware, or by a combination of software and hardware.

As shown in FIG. 2, AppContainer 32 may include one or more Tasks 35, which are operation units for processing data and/or application logic. Each Processor 33 may also include one or more Tasks.

In stream computing, computational logic implemented by an application can be referred to as a topology. A topology may include multiple levels of Tasks. As described above, a Task refers to an operation unit in stream computing. A Task may include one or more physical operation instances.

System 50 may support multi-level Tasks. Usually, the first-level Task may have processing to handle special data format and logic. Therefore, Tasks may be classified into first-level Tasks and non-first-level Tasks. Accordingly, logic processing units may also be classified into units for processing first-level Tasks and units for processing non-first-level Tasks. As shown in FIG. 2 and described above, logic processing units for processing first-level Tasks are referred to as AppContainers 32, while logic processing units for processing non-first-level Tasks are referred to as Processors 33.

Shard 31 may have the function of receiving data from one or more upstream data sources 28, such as from client terminals. Upon receiving the data, Shard 31 may write the data into a distributed file system 34 to ensure proper landing of the data. In some embodiments, distributed file system 34 may be part of stream computing system 50. The landed data may also be used by other systems or be used to provide other services, such as offline computation or batch computation. Shard 31 may then send the data to one or more AppContainers 32. As described above, an AppContainer may include one or more Tasks (e.g., Task 35). Each Task may include one or more physical operation instances. As described above, AppContainers 32 may handle first-level Tasks. Other non-first-level Tasks may be handled by one or more Processors 33. Data may be transmitted from the Tasks (e.g., first-level Tasks) in AppContainer 32 to the Tasks (e.g., non-first-level Tasks) in Processor 33. Upon receiving the data, each Processor may update a RedoLog, a log file of the distributed file system 34 for re-executing certain operations and/or recovering certain data in the event of a failover. The RedoLog may include effective data, metadata (e.g., RedoLogMeta), or other information. When a failover occurs, RedoLog may be used to recover system 50, including retransmitting data to certain Task(s) for processing. Data interchange among Tasks may be referred to as data Pipe. Data processed by system 50 may be stored in a database or used in one or more online services (36).

Figure 3:
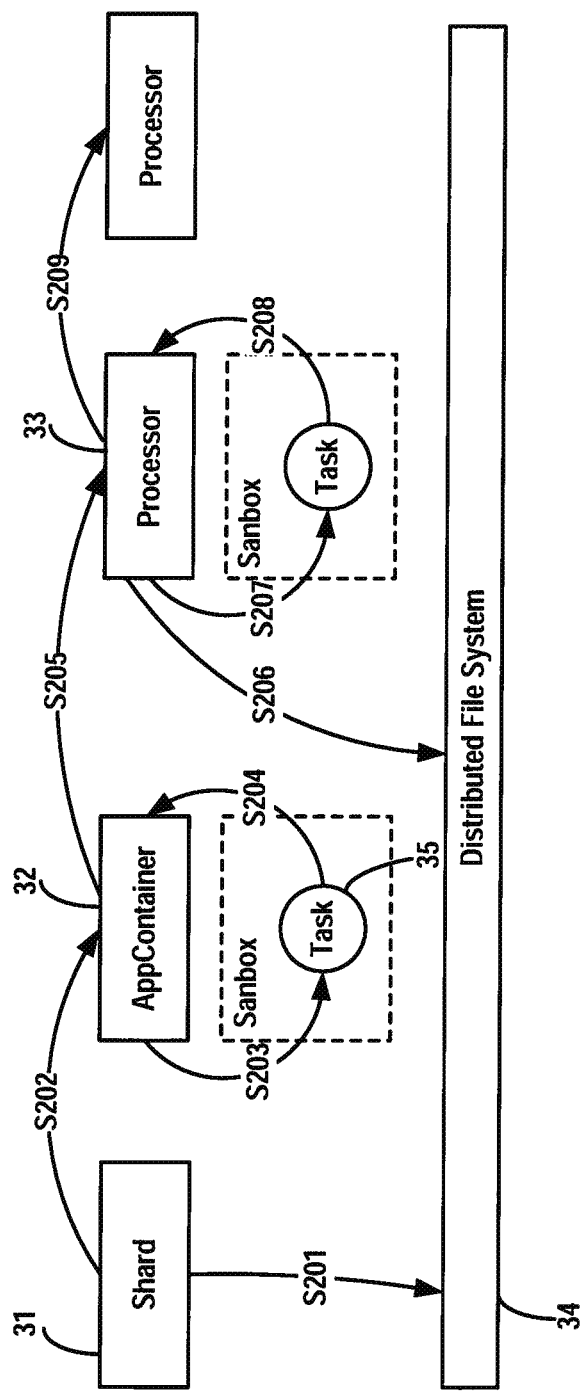
FIG. 3 shows an exemplary data processing flow, according to an embodiment of the present application.

FIG. 3 shows an exemplary data processing flow that can be performed by system 50 shown in FIG. 2. The data processing flow may include the following steps:

S201: upon receiving data, Shard 31 may assign a version number to the received data, and write the data along with the assigned version number into the distributed file system 34. The data may be stream data and may be received from one or more upstream data source 28.

The version number may be represented by <BatchID, SequenceID>. BatchID may relate to the time axis. For example, the BatchID may be incremented every 100 millisecond or other suitable time intervals. SequenceID may represent the order number of a record of data in a particular batch. In distributed file system 34, stored data may be sized by records. Each record may be uniquely identified by its version number <BatchID, SequenceID>.

S202: once the data has been written into distributed file system 34, Shard 31 may send the data to AppContainer 32.

In some embodiments, when Shard 31 sends data to AppContainer 32, the data may be transmitted in blocks. Each block may include one or more records, and each block has a unique BlockID.

Before transmitting data, Shard 31 may package or arrange one or more records into a block, and assign a unique identifier (e.g., a BlockID) to the block. Shard 31 may also maintain a block buffer for temporarily storing data blocks. For example, after packaging data records into blocks, Shard 31 may store the blocks into a memory. A backend operation thread may continuously read blocks stored in the memory and broadcast the blocks to AppContainer 32.

Separating data landing and stream computing, as disclosed herein (e.g., Shard 31 sends data to AppContainer 32 for stream computing after the data have been successfully written into distributed file system 34), can ensure proper data landing. The landed data would not be affected by subsequent stream computing operations (e.g., system failover).

S203: AppContainer 32 may obtain effective data that are neither lost nor duplicated and send to its Task(s) for processing. For example, AppContainer 32 may store an identifier of the latest received block (LatestBlockID). When the BlockID of a received block is not greater than LastestBlockID (i.e., BlockID<=LatestBlockID), AppContainer 32 may determine that the received block is a duplicated block, and may drop the block to ensure that the received data contain no duplicates.

In some embodiments, BlockID may be incremented continuously. Therefore, when the BlockID of a received block is greater than LatestBlockID+1 (i.e., BlockID>LatestBlockID+1), it may indicate that one or more blocks between the block corresponding to LatestBlockID and the received block are lost. The lost may be due to overflow of the block buffer in Shard 31 or network anomaly. In this case, AppContainer 32 may recover the lost data by reading landed data stored in distributed file system 34 to ensure entirety of the data. For example, data received by AppContainer 32 may include not only BlockID but also version number <BatchID, SequenceID>. When data lost occurs, AppContainer 32 may determine the version number of the lost data, and then obtain the lost data from distributed file system 34 according to the version number to recover the lost data.

In some embodiments, AppContainer 32 may send effective data that are neither lost nor duplicated to its Task(s) through file handles. A file handle is an identifier for locating a file in a file system.

S204: Task 35 may process the data received from AppContainer 32. Once the processing is complete, Task 35 may return the processed data back to AppContainer 32 for sending to the next-level Task(s).

In some embodiments, system 50 may provide services to outside requesters or users. The operations or codes executed by Task(s) may contain outside operations/codes. To improve system security, a Task may be operated in a Sandbox, which is a secure runtime environment having limited functionality, such as prohibition from accessing to network resources. Therefore, instead of directly transmitting data among Tasks, system 50 may require each Task to transmit the processed data to its AppContainer or Processor and use the AppContainer or Processor as intermediaries to transmit data between different levels of Tasks.

In some embodiments, Task and its AppContainer may be co-located within the same computational hardware. Therefore, data transmission between the Task and its AppContainer may not involve network transmission and the data are less likely to be lost. Accordingly, once the AppContainer (e.g., 32) ensures no loss of the data received from Shard 31, Task (e.g., 35) may also ensure that no loss of the data received from the AppContainer 32. Task 35 may be configured to ensure no data duplication. For example, Task 35 may maintain the latest version number of the received data (e.g., <LatestBatchID, LatestSequenceID>). Task 35 may determine whether the received data are duplicative by comparing the version number of the received data and the latest version number. If the version number of the received data is not greater than the latest version number, then Task 35 may determine that the received data are duplicative and may drop the data.

S205: when the Task in the next level is in a Processor (e.g., 33), AppContainer 32 may send the data (e.g., processed by Task 35) to Processor 33.

S206: Processor 33 may perform operations to remove duplicates in the data (e.g., similar to those performed by AppContainer 32 in S203), and then write the data (e.g., with duplicates removed) into the RedoLog of the distributed file system 34.

For each record subject to data processing, system 50 may support multiple outputs. Accordingly, for each output of a record, an output identifier may be added to the version number of the record. For example, the version number of an output may be <BatchID, SequenceID, OutputID>, which may uniquely identify each output. Processor 33 may maintain the latest version number of the received data (e.g., <LatestBatchID, LatestSequenceID, LatestOutputID>) and may remove duplicates by comparing the version number of received data and the lasted version number. Once duplicates are removed, Processor 33 may write the RedoLog.

In some embodiments, when Shard 31 writes data into the distributed file system 34, Shard 31 may also write the RedoLog corresponding to Shard 31.

The version number (<BatchID, SequenceID, OutputID>) of the data received by Processor 33 includes three ID numbers, and each of the three ID numbers is incremented continuously. When Processor 33 receives data, it may determine whether the data is duplicative according to the version number. If duplicative, then Processor 33 may drop the data. If the received data are new data, then Processor 33 may write the new data into the distributed file system 34 (e.g., into the RedoLog), and return an acknowledgement to AppContainer 32, ensuring no loss of the data. Accordingly, RedoLog may ensure that the data are neither lost nor duplicated.

S207: once the data have been written into the RedoLog, Processor 33 may send the data to its Task(s) for processing.

In case failover occurs, Processor 33 may recover any lost data from the RedoLog previously recorded.

S208: Task may processor the data, and may send the processed data to its Processor 33 for transmitting to the next-level Task if needed.

S209: if the next-level Task is in another Processor, Processor 33 may transmit the data to the next Processor.

In some embodiments, because Task(s) are operating within AppContainer 32 or Processor 33, data transmission involving the Task(s), AppContainer 32, and Processor 33 may be classified into parent thread (or parent unit) and child thread (or child unit). Specifically, receiving data by the AppContainer/Processor and transmitting the received data to the Task(s) within the AppContainer/Processor may be referred to as the parent thread/unit, while data/operation processing within the Task(s) may be referred to as the child thread/unit.

During data processing, Shard 31 may periodically write checkpoints (e.g., represented by CheckPoint). For example, the information of the CheckPoint corresponding to Shard 31 may be as follows:

```
{
    "BlockID": 10,
    "BatchID": 1,
    "SequenceID": 1,
    "TimestampForBatch": 1426622776,
    "ShardID": 123,
    "RedoLogMeta": {
        "DirID": 12,
        "DirName": "/stream_demo/test",
        "FileID": 17,
        "Offset": 134217728
    }
}
```

Figure 4:
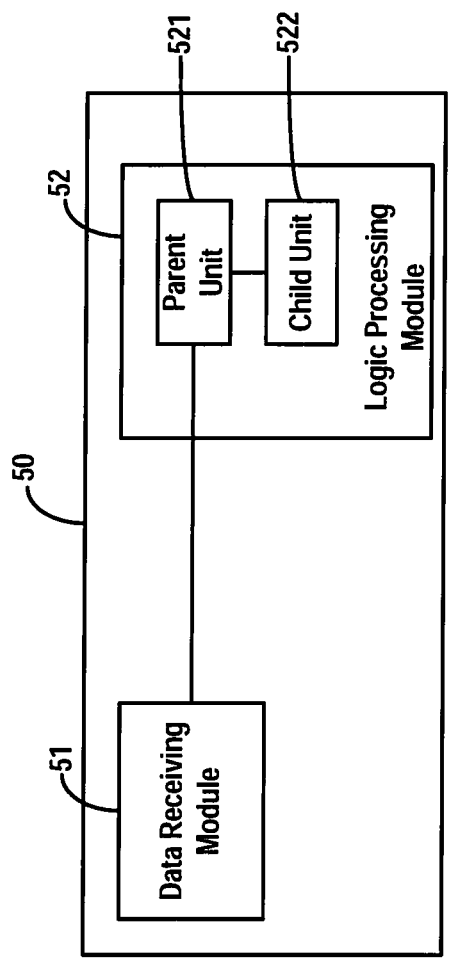
FIG. 4 is a functional block diagram of an exemplary stream computing system, according to an embodiment of the present application.

FIG. 4 shows an exemplary implementation of logic processing module 52 shown in FIG. 1, according to an embodiment of the present application. As shown in FIG. 4, logic processing module 52 may include a parent unit 521 and a child unit 522. As described above, AppContainer 32 may correspond to parent unit 521, while the Tasks within AppContainer 32 may correspond to child unit 522. Similarly, Processor 33 may correspond to parent unit 521, while the Tasks within Processor 33 may correspond to child unit 522.

Parent unit 521 may be configured to update a predefined checkpoint periodically. For example, parent unit 521 may periodically generate a checkpoint, and determine whether to make the generated checkpoint persistent. If parent unit 521 determines to make the generated checkpoint persistent, parent unit 521 may update the predetermined checkpoint with the generated checkpoint that has been determined to make persistent.

In some embodiments, determining whether to make the generated checkpoint persistent may be based on the version number of the data. For example, when storing effective data, the version number associated with each record of the data may also be stored. As described above, the version number may include a batch number (e.g., BatchID). Parent unit 521 may obtain a first batch number, which may be the BatchID of the latest effective data recorded by the parent unit 521, and may also obtain a second batch number, which may be the BatchID of the latest effective data recorded by child unit 522. Parent unit 521 may then compare the first and second batch numbers. When the first batch number (e.g., indicating the data in parent unit 521) is less than or equal to the second batch number (e.g., indicating the data in child unit 522), parent unit 521 may determine to make the generated checkpoint persistent. On the other hand, when the first batch number is greater than the second batch number, parent unit 521 may forego the process of making the checkpoint persistent.

Child unit 522 may be configured to recover the effective data stored in the child unit, receive the new data from parent unit 521, and remove duplicates from the received new data.

For example, Task 35 may write CheckPoint according to, for example, user specific operation logic. AppContainer 32 may also periodically generate CheckPoint. AppContainer 32 may determine whether to make the generated CheckPoint persistent based on the BatchID of the CheckPoint of Task 35. When the CheckPoint BatchID of AppContainer 32 is less than or equal to the CheckPoint BatchID of Task 35, AppContainer 32 may update (e.g., write) CheckPoint to make it persistent. Otherwise, AppContainer 32 may determine that the generated CheckPoint is invalid and may forego the process of making it persistent.

When a failover occurs, AppContainer 32 and Task 35 may reload their respective CheckPoints to recover to a previous snapshot. AppContainer 32 may retransmit at least a portion of the data to Task 35. Task 35 may drop any duplicates by comparing the version number of the retransmitted data and the version number of the data in Task 35.

Figure 5:
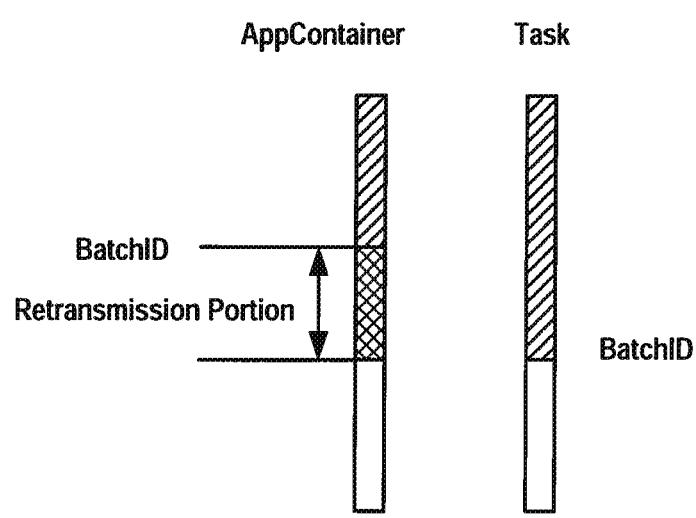
FIG. 5 shows an exemplary data recovery process, according to an embodiment of the present application.

FIG. 5 shows an exemplary recovering process in which the single-direction-lined shadow areas indicate the snapshot recovered from CheckPoints of AppContainer and Task. The CheckPoint of the AppContainer includes the latest Batch ID of the data in the AppContainer. Similarly, the CheckPoint of the Task includes the latest Batch ID of the data in the Task. Following a failover, both the AppContainer and the Task may be recovered by reloading their respective CheckPoints to recover the system to the snapshot recorded by the latest CheckPoints. Then, the AppContainer may continue to receive new data, indicated by the cross-lined shadow area, and retransmit that portion of the data to the Task. Upon receiving the retransmitted data, the Task may determine whether there are any duplicates by comparing the version numbers of the data, and remove the duplicates when found.

Similar process may also be used by Processor 33 to write CheckPoint and to recover from a failover.

According to the foregoing description, embodiments of the present application may ensure that during stream computing, the stream data subject to process are neither lost nor duplicated based on the interoperation among the RedoLog, CheckPoint, and version numbers. When a failover occurs, rapid recovery may be achieved by reading the RedoLog and CheckPoint, avoiding data retransmission from the data source.

In addition, Shard 31 may ensure proper data landing by writing the received data into the distributed file system 34. Shard 31 may also ensure that the data subject to processing are neither lost nor duplicated by assigning version numbers and block identifications to the data. Moreover, data retransmission from the data source can be avoided using CheckPoint and RedoLog.

Figure 6:
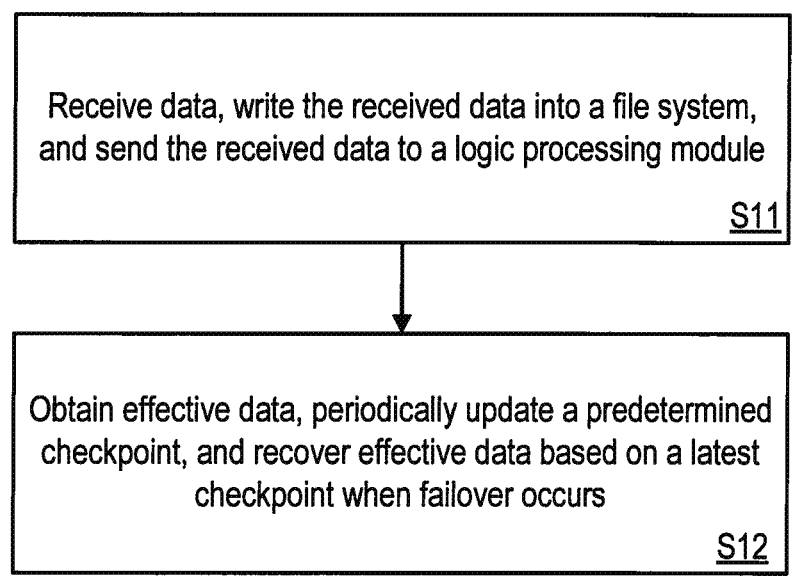
FIG. 6 is a flow chart of an exemplary method for processing stream data, according to an embodiment of the present application.

FIG. 6 is a flow chart of an exemplary method 10 for processing stream data, according to an embodiment of the present application. Method 10 may be performed by stream computing system 50 for processing stream data. Method 10 may comprise the following steps:

S11: data receiving module 51 (e.g., Shard 31) may receive data to be processed (e.g., stream data) and may write the received data into a file system (e.g., distributed file system 34). Once the data has been written into the file system, data receiving module 51 may send the data to logic processing module 52 (e.g., AppContainer 32) for performing data processing.

Upon receiving data, data receiving module 51 may divide the received data into at least one record according to data size. Data receiving module 51 may then assign a version number (e.g., <BatchID, SequenceID>) to each record, and write each record with the corresponding version number into the file system.

When sending the data to logic processing module 52, data receiving module 51 may arrange the data into at least one block, and assign a unique block identifier to each block (e.g., BlockID). Each block may include one or more records. Data receiving module 51 may send each block with the corresponding block identifier to logic processing module 52.

S21: logic processing module 52 may receive data from data receiving module 51 and may obtain effective data (e.g., data that are neither lost nor duplicated) based on conditions of the data received from data receiving module 51. Logic processing module 52 may update a predetermined checkpoint (e.g., CheckPoint) periodically. When a failover occurs, logic processing module 52 may determine a latest checkpoint, retrieve effective data corresponding to the latest checkpoint, and recover the effective data.

Logic processing module 52 may determine whether data received from data receiving module 51 are incomplete or experience loss during data transmission. Specifically, logic processing module 52 may maintain the latest block identifier (e.g., LatestBlockID) and compare the latest block identifier with the block identifier corresponding to a received block. As described above, logic processing module 52 may determine whether there is any loss of the data blocks based on the comparison. If logic processing module 52 determines that the data are incomplete (e.g., certain data are lost), logic processing module 52 may recover any lost data from the file system based on the version numbers corresponding to the lost data.

Logic processing module 52 may determine whether data received from data receiving module 51 contain duplicative data. As discussed above, duplication may be determined based on comparison of the latest block identifier with the block identifier corresponding to a received block. If duplicated data are identified, logic processing module 52 may drop the duplicated data.

Logic processing module 52 may store the effective data. The effective data may either be directly received, or may undergo recovery of lost data or removal of duplicated data. Logic processing module 52 may store the effective data in a log file (e.g., RedoLog) for recovering the effective data in the event of a failover. The log file may include metadata (e.g., RedoLogMeta) corresponding to the effective data.

In some embodiments, the latest checkpoint may include the metadata. When retrieving effective data from the latest checkpoint, logic processing module 52 may obtain the metadata corresponding to the effective data to be retrieved and retrieve the effective data from the log file based on the metadata.

When a failover occurs, logic processing module may locate the metadata in the latest checkpoint, and identify in the log file the effective data corresponding to the metadata to retrieve and recover the effective data. In this way, data retransmission from the source can be avoided.

The specification has described apparatuses and methods for stream computing. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Embodiments of the present application may be implemented using hardware, software, firmware, or any combination thereof. One or more steps, operations, functions, and modules described herein may be implemented by software instructions or codes stored in one or more memory devices and executed by one or more hardware processor devices. Exemplary hardware processor devices include logic gate circuitry configured or made to perform data processing and/or logic operations, integrated circuits (ICs) designed and made to perform specific functions, programmable gate arrays (PGAs), field-programmable gate arrays (FPGAs), etc.

Multiple function modules may be integrated into a single physical device, or may be provided in separate physical devices.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method, implemented by at least one processor device, for processing stream data, the method comprising:
receiving stream data from a data source;
dividing the received stream data into records;
assigning a version number to each record of the records, wherein each record is uniquely identifiable by the version number, the version number having a batch identification related to the received stream of data and a sequence number related to an order of a respective record in relation to the received stream of data;
writing the records with the corresponding version numbers into a file system;
arranging the records into at least one block;
sending the at least one block to a logic processing module after the records are successfully written into the file system;
generating a checkpoint including a version number of a latest received record;
determining whether the generated checkpoint is valid based on the version number; and
writing the checkpoint in the file system in response to the generated checkpoint being valid.

2. The method of claim 1, further comprising:
assigning a unique block identifier to each of the at least one block; and
sending the at least one block with the corresponding block identifier to the logic processing module.

3. The method of claim 1, further comprising:
temporarily storing the at least one block in a block buffer; and
sending the at least one block by continuously reading the block buffer and broadcasting information read from the block buffer to the logic processing module.

4. A method, implemented by at least one processor device, for processing data, the method comprising:
receiving data from a data processing module, wherein the received data include one or more records and a version number corresponding to each of the one or more records;
determining whether the received data are effective data that are neither incomplete nor duplicative;
obtaining the effective data in response to the determination that the received data are either incomplete or duplicative;
storing the effective data in a log file of a file system;
generating a checkpoint including a version number of a latest received record of the effective data;
determining whether the generated checkpoint is valid based on the version number; and
writing the generated checkpoint in the file system in response to the generated checkpoint being valid.

5. The method of claim 4, wherein the received data include at least one block and a block identifier corresponding to each of the at least one block, and the method further comprising:
storing an identifier of a latest received block; and
determining whether the received data are effective data by comparing the identifier of the latest received block with the block identifier.

6. The method of claim 5, wherein obtaining the effective data comprises:
in response to a determination that the received data include a duplicated block, dropping the duplicated block.

7. The method of claim 4, wherein obtaining the effective data comprises:
retrieving lost data from the file system in response to a determination that the received data are incomplete.

8. The method of claim 7, comprising:
determining the version number corresponding to the lost data; and
retrieving the lost data from the file system based on the determined version number.

9. The method of claim 4, further comprising:
transmitting the obtained effective data to an operation unit for processing, wherein the operation unit operates in a secure runtime environment;
receiving processed data from the operation unit; and
sending the processed data to a second data processing module.

10. The method of claim 9, further comprising:
determining, by the operation unit, whether the operation unit receives duplicative data by comparing a version number corresponding to data received by the operation unit and a latest version number corresponding to latest received data by the operation unit; and
dropping, by the operation unit, the duplicative data in response to the determination that the operation unit receives the duplicative data.

11. The method of claim 9, further comprising:
generating, by the operation unit, at least one outputs by processing the effective data;
assigning, by the operation unit, a version number to each of the at least one outputs; and
determining whether the received processed data include duplicative data by comparing the version number assigned to each of the at least one outputs with a latest version number corresponding to latest received processed data.

12. The method of claim 4, wherein the version number includes a first batch number indicating a latest record received by a parent operation unit of the at least one processor device, the parent operation unit being configured to update the checkpoint periodically, and wherein determining whether the generated checkpoint is valid based on the version number comprises:
comparing the first batch number with a second batch number, the second batch number corresponding to a latest record received by a child operation unit of the at least one processor device, the child operation unit being configured to receive data from the parent operation unit; and
wherein writing the generated checkpoint in the file system in response to the generated checkpoint being valid comprises:
writing the generated checkpoint in the file system in response to the first batch number being less than or equal to the second batch number.

13. The method of claim 4, further comprising:
recovering the effective data from the log file based on the checkpoint in a failover event; and
transmitting at least a portion of the recovered effective data to an operation unit.

14. A system for processing stream data, comprising:
a data receiving module including at least one processor device, the data receiving module being configured to:
receive stream data from a data source;
divide the received stream data into records;
assign a version number to each record of the records, wherein each record is uniquely identifiable by the version number, the version number having a batch identification related to the received stream of data and a sequence number related to an order of a respective record in relation to the received stream of data;
write the records into a file system;
arrange the records into at least one block;
send the at least one block to a logic processing module after the records are successfully written into the file system;
generate a checkpoint including a version number of a latest received record;
determine whether the generated checkpoint is valid based on the version number; and
write the checkpoint in the file system in response to the generated checkpoint being valid; and
the logic processing module including at least one processor device, the logic processing module being configured to:
receive the at least one block from the data receiving module;
determine whether the received at least one block are effective data that are neither incomplete nor duplicative;
obtain the effective data in response to the determination that the received data are either incomplete or duplicative;
store the effective data in a log file of the file system;
generate a checkpoint including a version number of a latest received record of the effective data;
determine whether the generated checkpoint is valid based on the version number; and
write the generated checkpoint in the file system in response to the generated checkpoint being valid.

15. The system of claim 14, wherein the received at least one block includes a block identifier corresponding to each of the at least one block, and wherein the logic processing module is further configured to:
store an identifier of a latest received block; and
determine whether the received at least one block are effective data by comparing the identifier of the latest received block with the block identifier.

16. The system of claim 14, wherein the logic processing module is further configured to:
retrieve lost data from the file system in response to a determination that the received at least one block is incomplete.

17. The system of claim 16, wherein the received at least one block includes one or more records and a version number corresponding to each of the one or more records, and wherein the logic processing module is further configured to:
determine the version number corresponding to the lost data; and
retrieve the lost data from the file system based on the determined version number.

18. The system of claim 14, wherein the logic processing module includes at least one operation unit, and wherein the logic processing module is further configured to:
transmit the obtained effective data to the at least one operation unit for processing, wherein the at least one operation unit operates in a secure runtime environment;
receive processed data from the at least one operation unit; and
send the processed data to a second logic processing module.

19. The system of claim 18, wherein the at least one operation unit is configured to:

determine whether the at least one operation unit receives duplicative data by comparing a version number corresponding to data received by the at least one operation unit and a latest version number corresponding to latest received data by the at least one operation unit; and
drop the duplicative data in response to a determination that the at least one operation unit receives the duplicative data.

20. The system of claim 18, wherein:
the at least one operation unit is further configured to:
generate at least one outputs by processing the effective data; and
assign a version number to each of the at least one outputs; and
the logic processing module is further configured to:
determine whether the received processed data include duplicative data by comparing the version number assigned to each of the at least one outputs with a latest version number corresponding to latest received processed data.

21. The system of claim 14, wherein the version number includes a first batch number, and the logic processing module is further configured to:
compare the first batch number with a second batch number, the second batch number corresponding to a latest record received by an operation unit of the logic processing module; and
write the generated checkpoint in the file system in response to the first batch number being less than or equal to the second batch number.

22. The system of claim 14, wherein the logic processing module is further configured to:
recover the effective data from the log file based on the checkpoint in a failover event; and
transmit at least a portion of the recovered effective data to an operation unit of the logic processing module.

23. An apparatus for processing stream data, comprising:
at least one processor device configured to execute instructions to cause the apparatus to:
receive stream data from a data source;
divide the received stream data into records;
assign a version number to each record of the records, wherein each record is uniquely identifiable by the version number, the version number having a batch identification related to the received stream of data and a sequence number related to an order of a respective record in relation to the received stream of data;
write the records with the corresponding version numbers into a file system;
arrange the records into at least one block;
send the at least one block to a logic processing device after the records are successfully written into the file system;
generate a checkpoint including a version number of a latest received record;
determine whether the generated checkpoint is valid based on the version number; and
write the checkpoint in the file system in response to the generated checkpoint being valid.

24. An apparatus for processing stream data, comprising:
at least one processor device configured to execute instructions to cause the apparatus to:

receive data from a data processing device, wherein the received data include one or more records and a version number corresponding to each of the one or more records;
determine whether the received data are effective data that are neither incomplete nor duplicative;
obtain the effective data in response to the determination that the received data are either incomplete or duplicative;
store the effective data in a log file of a file system;
generate a checkpoint including a version number of a latest received record of the effective data;
determine whether the generated checkpoint is valid based on the version number; and
write the generated checkpoint in the file system in response to the generated checkpoint being valid.

\* \* \* \* \*